United States Patent
Hirni et al.

(10) Patent No.: US 7,794,110 B2
(45) Date of Patent: Sep. 14, 2010

(54) ANTI-COLLISION LIGHT FOR AN AIRCRAFT

(75) Inventors: Heini E. Hirni, Sulzbach (CH); Thomas Schedler, Steinmaur (CH)

(73) Assignee: Flight Components AG (CH)

( * ) Notice: Subject to any disclaimer, the term of this patent is extended or adjusted under 35 U.S.C. 154(b) by 0 days.

(21) Appl. No.: 12/135,485

(22) Filed: Jun. 9, 2008

(65) Prior Publication Data

US 2008/0310176 A1 Dec. 18, 2008

(30) Foreign Application Priority Data

Jun. 13, 2007 (EP) .................................. 07011525

(51) Int. Cl.
*F21V 1/00* (2006.01)

(52) U.S. Cl. .................... 362/241; 362/249.02; 362/470

(58) Field of Classification Search ................. 362/240, 362/241, 247, 249.02, 249.06, 249.14, 470, 362/800; 340/815.4, 815.45, 981, 983
See application file for complete search history.

(56) References Cited

U.S. PATENT DOCUMENTS

| | | | |
|---|---|---|---|
| 5,519,596 A | 5/1996 | Woolverton | |
| 2004/0213014 A1 * | 10/2004 | Koike | 362/241 |
| 2006/0007013 A1 | 1/2006 | Singer et al. | |
| 2006/0077071 A1 | 4/2006 | Brenner et al. | |
| 2006/0198141 A1 | 9/2006 | Peck et al. | |
| 2006/0209541 A1 | 9/2006 | Peck | |
| 2007/0002572 A1 | 1/2007 | Ewig et al. | 362/470 |
| 2008/0074279 A1 * | 3/2008 | Chiu et al. | 340/815.45 |

FOREIGN PATENT DOCUMENTS

| | | |
|---|---|---|
| DE | 296 03 557 | 5/1996 |
| EP | 1 510 457 | 3/2005 |
| EP | 1 698 823 | 9/2006 |
| EP | 1731423 B1 | 11/2008 |
| ES | 2 185 509 | 4/2003 |

OTHER PUBLICATIONS

European Search Report dated Sep. 24, 2007 for Application No. 07011525.8-2422 (8 pages).

* cited by examiner

*Primary Examiner*—Y My Quach Lee
(74) *Attorney, Agent, or Firm*—Ostrolenk Faber LLP (57) ABSTRACT

An anti-collision light for an aircraft with a first light emitting level and a second light emitting level, wherein the first light emitting level is arranged above the second light emitting level and each light emitting level comprises a board on which light emitting diodes are arranged and a reflector for reflecting light emitted by the light emitting diodes essentially perpendicular to the board in a lateral direction, and wherein on the board of the first light emitting level the light emitting diodes are arranged on at least one straight line and on the board of the second light emitting level the light emitting diodes are arranged on a closed line that essentially has the shape of an ellipse or a rounded rectangle. An anti-collision light with a first light emitting level being arranged above a second light emitting level and pointing into the opposite direction than the second light emitting level, wherein both on a board of the first light emitting level and on a board of the second light emitting level light emitting diodes are arranged on a straight line.

18 Claims, 9 Drawing Sheets

Fig. 10

ANTI-COLLISION LIGHT FOR AN AIRCRAFT

CROSS REFERENCES TO RELATED APPLICATIONS

This application claims the priority of the European patent application 07 011 525.8, filed Jun. 13, 2007, the disclosure of which is incorporated herein by reference in its entirety.

TECHNICAL FIELD

The invention relates to anti-collision lights for aircrafts and, in particular, to anti-collision lights with light emitting diodes as light sources.

BACKGROUND ART

Internal regulations for aircrafts as for example issued by the European Aviation Safety Agency (EASA) or as the Federal Aviation Regulations (FAR) require an external lighting which in addition to position lights comprises so called anti-collision lights. The anti-collision lights shall radiate by day and by night at an intensity level which shall lie above a certain predefined minimum intensity level indicated in candela. According to the EASA the anti-collision light shall, in particular, radiate in red (so called aviation red) or in white (so called aviation white) with the predetermined intensity and tint and a predetermined given solid angle.

From the European patent application EP 1 510 457 A2 is known an anti-collision light for aircrafts with a first circuit board on which light emitting diodes arranged and second circuit board on which light emitting diodes are arranged, the first circuit board and the second circuit board being arranged essentially coplanar in a back to back facing manner. First and second reflecting means are provided that are arranged such above the first circuit board and the second circuit board, respectively, that light emitted from the light emitting diodes essentially perpendicular to the corresponding circuit board is reflected in a sidewards direction. The light emitting diodes are ranged in a circle, a horseshoe-like shape or a matrix-like shape on the corresponding circuit board. The light emitting diodes are surrounded by additional reflecting means that direct light emitted sidewardly by the light emitting diodes in a direction essentially perpendicular to the circuit board. The additional reflecting means are mounted on the corresponding circuit boards. The additional reflecting means are ring-shaped parts having holes with tapered, reflecting sidewalls.

DISCLOSURE OF THE INVENTION

It is an object of the invention to provide an anti-collision light with a high intensity of radiation over a large angle range, while having a compact design. Furthermore, the anti-collision light should be easy to manufacture.

In order to implement these and still further objects of the invention, which will become more readily apparent as the description proceeds, an anti-collision light for an aircraft is provided which has a first light emitting level and a second light emitting level, wherein the first light emitting level is arranged above the second light emitting level and each light emitting level comprises a board, in particular a circuit board, on which light emitting diodes are arranged and a reflector for reflecting light emitted by the light emitting diodes essentially perpendicular to the board in a lateral direction. On the board of the first light emitting level the light emitting diodes are arranged on at least one straight line, preferably on two parallel straight lines, and on the board of the second light emitting level the light emitting diodes are arranged on a closed line that essentially has the shape of an ellipse or a rounded rectangle.

The anti-collision light may be installed on top and/or the bottom of the fuselage of an aircraft. Preferentially, light emitting diodes which emit red light are used. Alternatively, light emitting diodes emitting white light which are covered by a red filter, for example a red transparent layer, may be employed.

Preferentially the straight line (or the straight lines) on which the light emitting diodes are arranged on the board of the first light emitting level is perpendicular to the major axis of the ellipse or the rounded rectangle, respectively, on which the light emitting diodes of the second light emitting level are arranged. For an ellipse the major axis is defined as the longest line that can be obtained by joining two points on the ellipse. For a rounded rectangle the major axis is defined as the longer of its two centerlines or median lines.

According to a preferred embodiment of the invention a third light emitting level is provided that is arranged below the second light emitting level and comprises a board, in particular a circuit board, on which light emitting diodes are arranged and a reflector for reflecting light emitted by the light emitting diodes essentially perpendicular to the board in a lateral direction, wherein the light emitting diodes are arranged on a closed line that essentially has the shape of an ellipse or rounded rectangle similar to the arrangement of the light emitting diodes on the board of the second light emitting level.

The third light emitting level is preferably arranged such that the major axis of the ellipse or rounded rectangle on which its light emitting diodes are arranged runs in parallel and is aligned with the major axis of the ellipse or the rounded rectangle on which the light emitting diodes of the second light emitting level are arranged. Furthermore the major axis of the ellipse or the rounded rectangle on which the light emitting diodes of the third light emitting level are arranged is preferentially perpendicular to the straight line or the two straight lines on which the light emitting diodes of the first light emitting level are arranged.

The centre points of the first emitting level, the second light emitting level and the third light emitting level are preferably arranged on a common longitudinal axis, preferably together with a socket and a housing of the anti-collision light.

Through the provision of at least two light emitting levels, preferably of three light emitting levels, a high intensity of radiation can be achieved in the longitudinal direction and light can be emitted in a polar angle range of 0 degrees to approximately 75 degrees. Having light emitting diodes arranged on the second light emitting level and on the third light emitting level on the longer sides of a rounded rectangle or on an ellipse, respectively, yields a high intensity of radiation in the axial direction, the axial direction being defined as the direction corresponding to the major axis of the rounded rectangle or the ellipse. Furthermore, the anti-collision light according to the invention has a compact design and can easily be manufactured.

In order to implement the objects of the invention, a further anti-collision light for an aircraft is provided which has a first module with a first light emitting level and a second light emitting level, wherein the first light emitting level is arranged above the second light emitting level, the first light emitting level pointing into the opposite direction than the second light emitting level. Each light emitting level comprises a board, in particular, a circuit board, on which light emitting diodes are arranged and a reflector for reflecting light emitted by the light emitting diodes essentially perpendicular to the board in a lateral direction. Both on the board of the first light emitting level and on the board of the second light emitting level the light emitting diodes are arranged on a straight line and the straight lines preferably run in parallel to each other and are coplanar in space, i.e. they lie in the same geometric plane. Preferentially, light emitting diodes which emit white light are used.

Next to the first module is preferably arranged at least one second module that is constructed in the same way as the first module. The at least one second module may be arranged on a lower level than the at least one first module.

Next to the at least one second module there is preferably arranged at least one third module, that is arranged on a lower level than the at least one second module and is constructed in the same way as the second module. The at least one third module may preferably be arranged in an angle with respect to the at least one second module, the angle preferably being an obtuse angle. It is of course also possible to arrange the at least one second module in an angle, preferably an obtuse angle with respect to the at least one first module.

Next to the at least one third module there is preferentially arranged at least one forth module, that is arranged on a lower level than the at least one third module and constructed in the same way as the third module. The at least one forth module may be arranged in an angle, preferably an obtuse angle, with respect to the at least one third module.

According to a preferred embodiment the anti-collision light comprises four equally constructed modules corresponding to the above mentioned first to fourth module which are arranged next to each other, wherein each subsequent module is arranged at a lower level than the preceding module and the third module is arranged at an obtuse angle with respect to the second module and the forth module is arranged at an obtuse angle with respect to the third module.

Such an anti-collision light is by its construction especially well suited for an application at the wings of an aircraft. It is constructed in a compact way and can be easily manufactured.

BRIEF DESCRIPTION OF THE DRAWINGS

Further advantageous features and applications of the invention can be found in the dependent claims as well as in the following description of the drawings illustrating the invention. In the drawings like reference signs designate the same or similar parts throughout the several figures of which:

MODES FOR CARRYING OUT THE INVENTION

Figure 1:
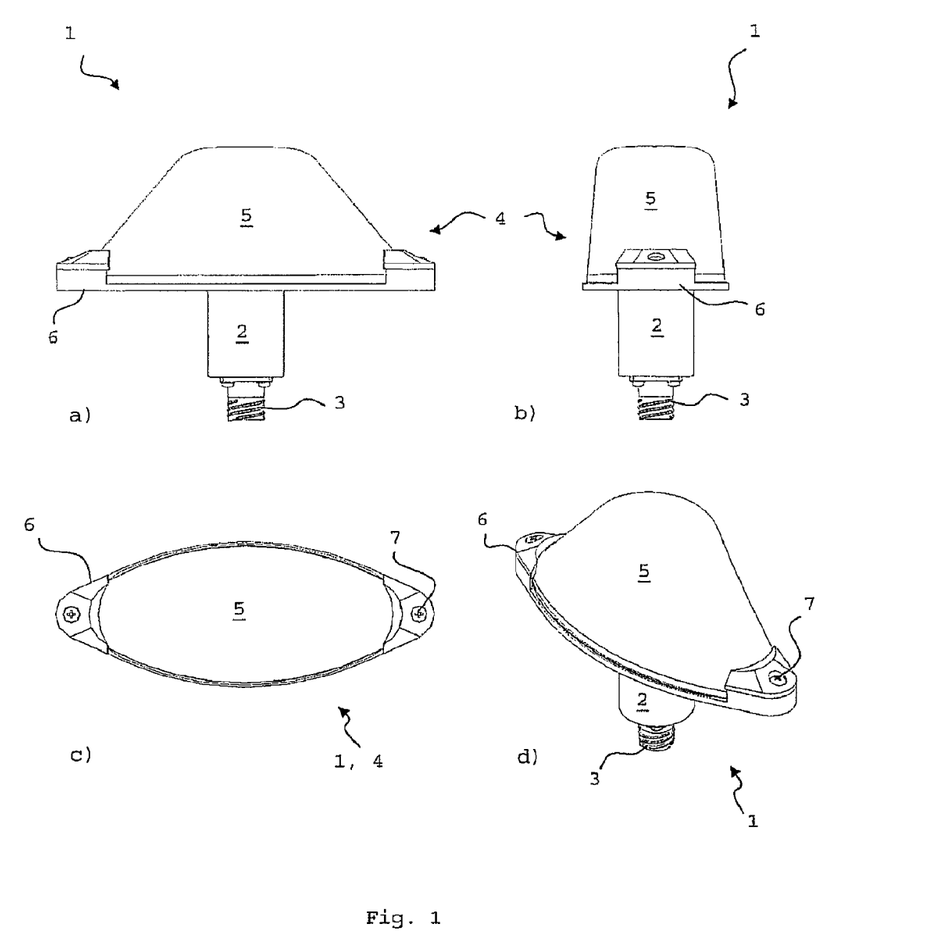
FIG. 1 shows a first embodiment of an anti-collision light in front view (FIG. 1a), side view (FIG. 1b), top view (FIG. 1c) and perspective view (FIG. 1d)

FIG. 1 shows a first embodiment 1 of an anti-collision light according to the invention from the outside in various views. The anti-collision light 1 comprises a socket part 2, 3 and a housing 4. The lower socket part 3 has a screw thread with which it may be attached to the fuselage of an aircraft. The housing 4 consists of a transparent cover 5 as housing upper part and a housing lower part 6 to which the transparent cover 5 is attached.

Figure 2:
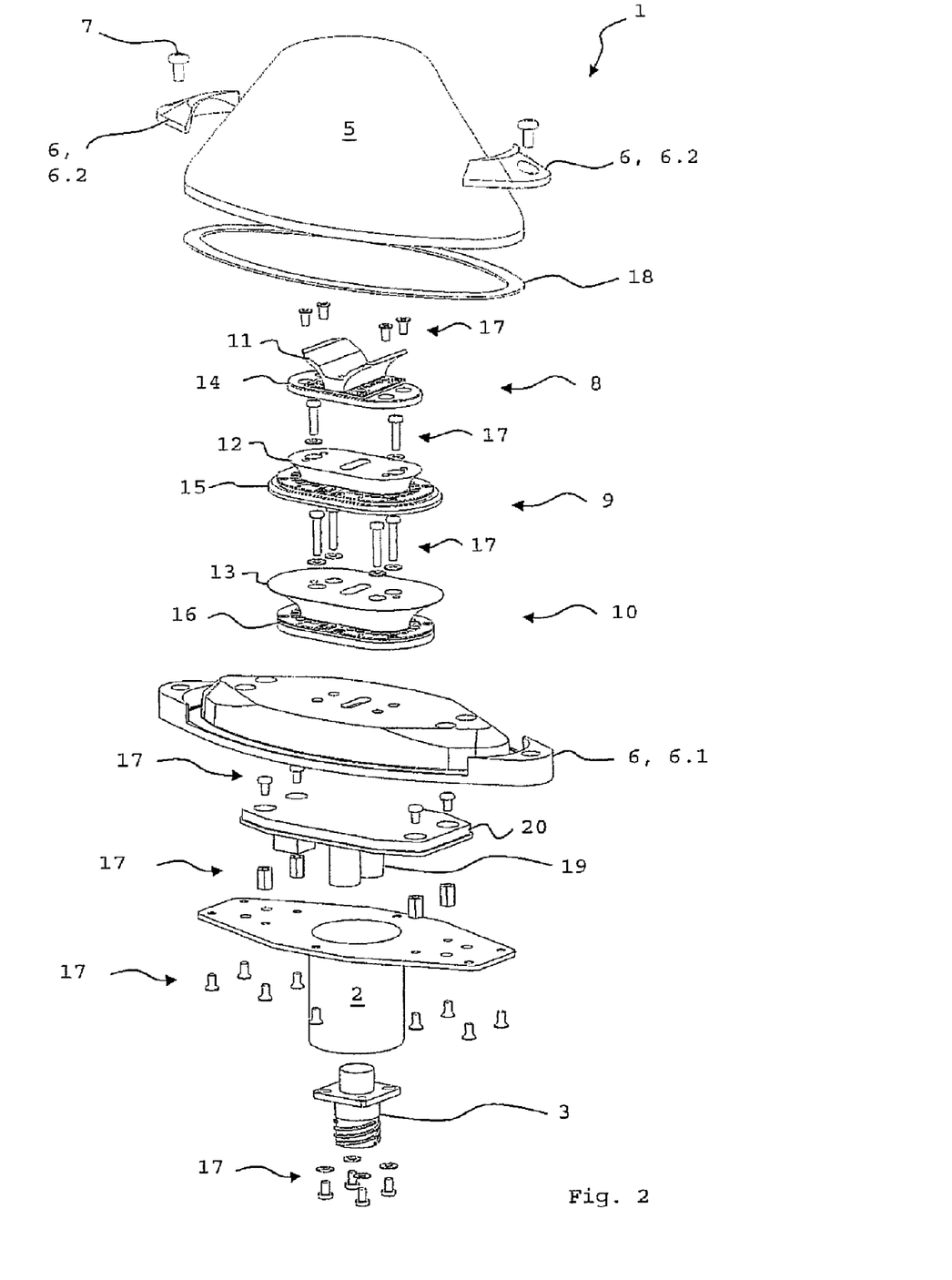
FIG. 2 shows an exploded view of the first embodiment of the anti-collision light.

FIG. 2 shows an exploded view of the first embodiment of the anti-collision light 1 depicted in FIG. 1. The housing lower part 6 preferably consists of a support part 6.1 and two frame parts 6.2 which are connected to the support part 6.1, thereby clamping the transparent cover 5 with connecting means 17, such as rivets and screws. Between the transparent cover 5 and the support part 6.1 of the housing lower part 6 there is provided a sealing ring 18. The support part 6.1 of the housing lower part 6, the sealing ring 18 and the rim of the transparent cover 5 preferably all have the shape of an ellipse or a rounded rectangle, respectively.

Inside the housing 4, i.e. between the transparent cover 5 and the housing lower part 6 there are provided a first light emitting level 8, a second light emitting level 9, and a third light emitting level 10. Each light emitting level 8, 9, 10 consists of a reflector 11, 12, 13 and a board unit 14, 15, 16 which are described in detail in conjunction with FIGS. 3 and 4. The first light emitting level 8, the second light emitting level 9 and the third light emitting level 10 are aligned along a longitudinal axis running through their centre points and are connected to each other by corresponding connecting means 17, such as rivets, screws and washers. The third light emitting level 10 is attached to the support part 6.1 of the housing lower part 6 by corresponding connecting means 17 such as mentioned above.

The socket part 2 is preferably hollow for receiving electronic components 19, such as capacitors, for supplying the board units 14, 15, 16 with electrical energy and/or for controlling the board units 14, 15, 16. The electrical components 19 are preferably mounted on a components board 20. The support part 6.1 of the housing lower part 6, the components board 20 and the socket parts 2, 3 are connected to each other by corresponding connecting means 17 such as for example rivets, screws, washers and screw nuts, respectively.

Figure 3:
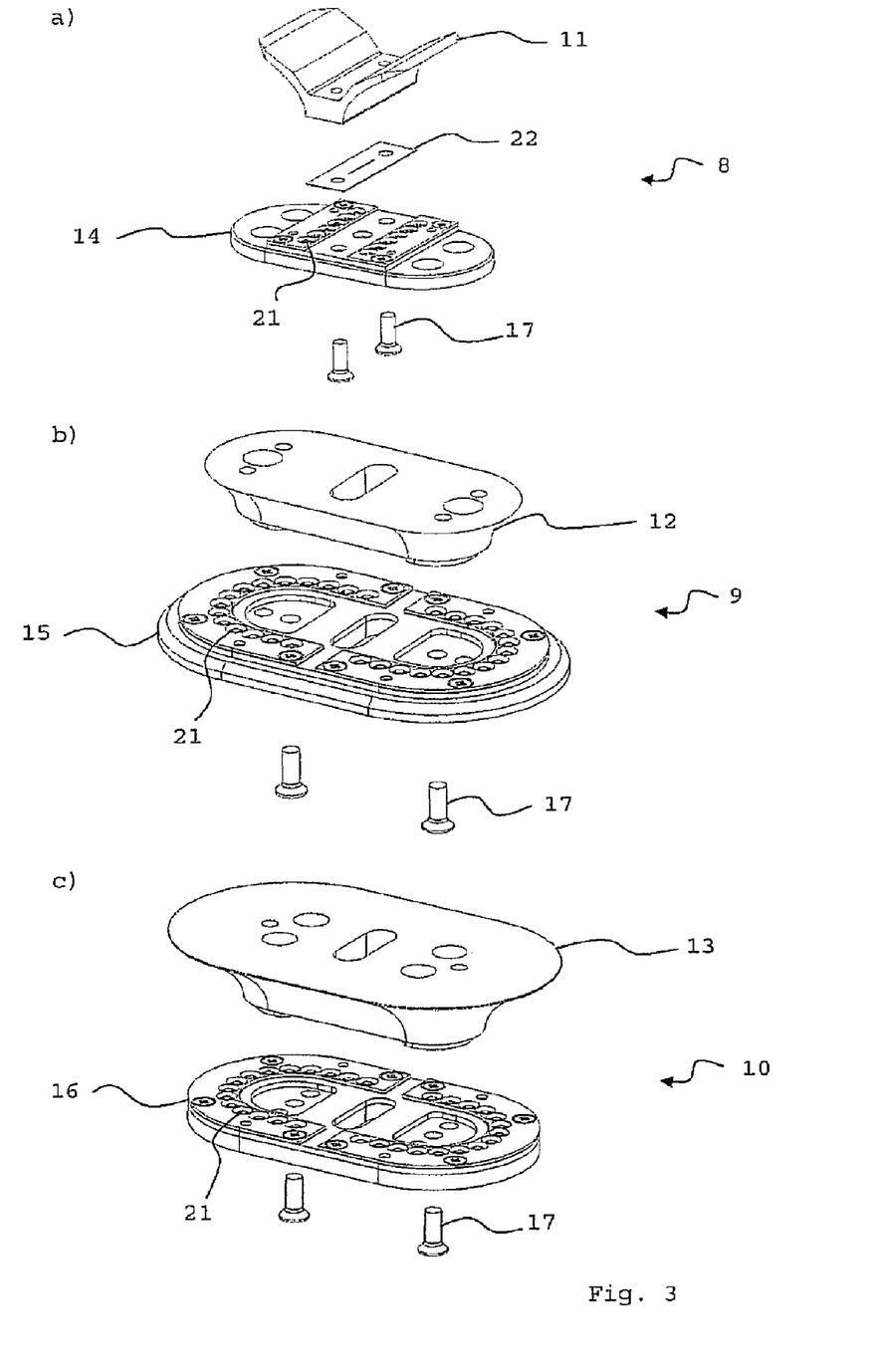
FIG. 3 shows exploded views of a first light emitting level (FIG. 3a), a second light emitting level (FIG. 3b) and a third emitting level (FIG. 3c) of the first embodiment of the anti-collision light.

FIG. 3 shows in FIG. 3a an exploded view of the first light emitting level 8, in FIG. 3b an exploded view of the second light emitting level 9 and in FIG. 3c an exploded view of the third light emitting level 10. The first light emitting level 8 comprises a reflector 11 and a board unit 14. The board unit 14 has the shape of a rounded rectangle or, alternatively, of an ellipse. The board unit 14 has light emitting diodes 21 arranged in two parallel straight lines which are essentially perpendicular to the side walls and the major axis of this rounded rectangle (or alternatively to the major axis of an ellipse).

Between the parallel straight lines of the light emitting diodes 21 is positioned a reflector 11. The reflector 11 is parabolically shaped. In particular, the reflector 11 has essentially the same length as the straight lines of light emitting diodes 21 and basically has the cross section of a "V" with each arm of the "V" being parabolically shaped so that it reflects light emitted by the light emitting diodes 21 essentially perpendicular to the board unit 14 in a lateral direction.

Between the reflector 11 and the board unit 14 a washer 22 is provided, the reflector 11, the board unit 14 and the washer 22 being connected to each other by appropriate connecting means 17 as mentioned above, in particular by rivets.

The second light emitting level 9 and the third emitting level 10 each comprise a board unit 15, 16 and a reflector 12, 13, the board units 15, 16 and the reflectors 12, 13 each having a base area with the shape of a rounded rectangle or alternatively of an ellipse. The upper surface of the reflectors 12, 13 is larger than the lower surface (i.e. the base area) of the reflectors 12, 13 and the walls of the reflectors 12, 13 are parabolically shaped. The board units 15, 16 have light emitting diodes 21 that are arranged on a rounded rectangle or alternatively on an ellipse, wherein the rounded rectangle or the ellipse may be formed by two horse-shoes positioned with the openings towards each other. The lower surfaces (i.e. the base areas) of the reflectors 12, 13 are then positioned within the rounded rectangle or alternatively the ellipse of light emitting diodes 21 for reflecting light emitted by the light emitting diodes 21 essentially perpendicular to the board units 15, 16 in a lateral direction. The reflectors 12, 13 are connected with their corresponding board units 15, 16 by connecting means 17 as mentioned above, in particular by rivets.

The dimensions of the upper surface of the reflector 13 of the third light emitting level 10 preferably correspond to the dimensions of the board unit 15 (i.e. its base area) of the second light emitting level 9. The dimensions of the upper surface of the reflector 12 of the second light emitting level 9 preferably correspond to the dimensions of the board unit 14 (i.e. its base area) of the first light emitting level 8.

Figure 4:
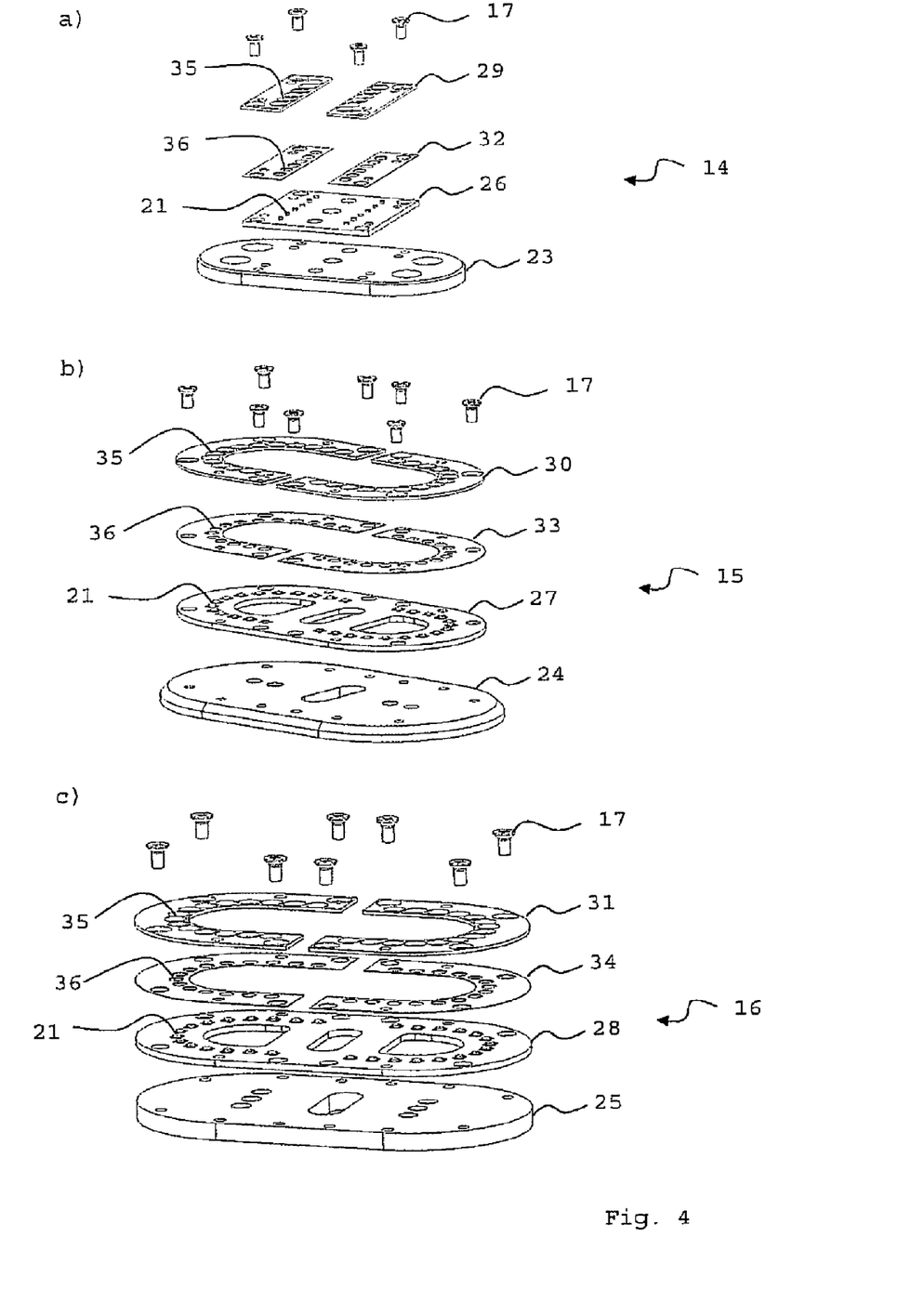
FIG. 4 shows exploded views of a board unit of the first light emitting level (FIG. 4a), the second light emitting level (FIG. 4b) and the third light emitting level (FIG. 4c) of the first embodiment of the anti-collision light.

FIG. 4 depicts in FIG. 4a an exploded view of the board unit 14 of the first light emitting level 8, in FIG. 4b an exploded view of the board unit 15 of the second light emitting level 9 and in FIG. 4c an exploded view of the board unit 16 of the third light emitting level 10.

Each board unit 14, 15, 16 comprises a support member 23, 24, 25 on which a board 26, 27, 28, in particular a circuit board, with light emitting diodes 21 is placed, a reflector element 29, 30, 31 which is placed on the corresponding board 26, 27, 28, and preferably a reflecting layer 32, 33, 34 which is provided between the corresponding board 26, 27, 28 and the corresponding reflector element 29, 30, 31. The support member 23, 24, 25, the board 26, 27, 28, the reflecting layer 32, 33, 34 and the reflector element 29, 30, 31 of each board unit 14, 15, 16 are connected to each other by appropriate connecting means 17 such as mentioned above, in particular by screws.

Each reflector element 29, 30, 31 is disposed over the light emitting diodes 21 of the associated board 26, 27, 28, wherein each reflector element 29, 30, 31 preferentially comprises reflector cups 35 with each reflector cup 35 having an aperture for receiving a light emitting diode 21 of the associated board 26, 27, 28. The reflector elements 29, 30, 31 are hence constructed such that light emitted sideward by the light emitting diodes 21 is directed essentially perpendicular to the associated board 26, 27, 28.

Each reflecting layer 32, 33, 34, which is positioned between its associated reflector element 29, 30, 31 and its associated board 26, 27, 28, has apertures 36 for receiving the light emitting diodes 21. Each reflecting layer 32, 33, 34 preferably has a reflecting surface, for example a thin gold layer. By the apertures 36 the reflecting layer 32, 33, 34 does not cover the light emitting diodes 21 and preferably bond wires (not shown) connecting the light emitting diodes 21 with the corresponding board 26, 27, 28. Furthermore, possible connectors (not shown) which may be printed on the board 26, 27, 28 and which may lead from the bond wires (not shown) to contact areas (not shown) of electric wires, that are used for supplying the light emitting diodes 21 with electrical energy and that are printed on the board 26, 27, 28, are not covered by the reflecting layer 32, 33, 34.

The support members 23, 24, 25 of the three board units 14, 15, 16 preferably each have the shape of a rounded rectangle or an ellipse, respectively. The support member 24 of the board unit 15 of the second light emitting level 9 may have equal or smaller dimensions than the support member 25 of the board unit 16 of the third light emitting level 10. The support member 23 of the board unit 8 of the first light emitting level 8 is preferably of smaller dimension than the support member 24 of the board unit 15 of the second light emitting level 9.

The shape of the board 27 of the board unit 15 of the second light emitting level 9 preferably corresponds to the shape of the support member 24 of the board unit 15. Hence, it has either the shape of a rounded rectangle or of an ellipse depending on the shape of the support member 24. Correspondingly, the light emitting diodes 21 are arranged on the board 27 on a closed line that essentially has the shape of a rounded rectangle or of an ellipse. The same holds true for the board 28 of the board unit 16 of the third light emitting level 10 in relation to the support member 25 of the board unit 16 and for the light emitting diodes 21 placed on the board 28.

Correspondingly, the shape of the reflecting layer 33 and the shape of the reflector element 30 each correspond to the shape of the board 27 of the board unit 15 of the second light emitting level 9, with the reflector cups 35 of the reflector element 30 and the apertures 36 of the reflecting layer 33 being arranged on a closed line corresponding to the closed line on which the light emitting diodes 21 of the board 27 are arranged. The same is the case for the reflector element 31 and its reflector cups 35 and the reflecting layer 34 and its apertures 36 in relation to the board 28 and its light emitting diodes 21.

The board 26 of the board unit 14 of the first light emitting layer 8 preferably has a quadratic or rectangular shape with light emitting diodes 21 being arranged in two parallel straight lines, wherein the parallel straight lines are essentially perpendicular to the major axis of the support member 23, the support member 23 having the shape of a rounded rectangle or of an ellipse. If the support member 23 is a rounded rectangle than the depth of the board 26 corresponds to the depth of the support member 23 and the length of the board 26 basically corresponds to the length of the straight part of the longer side of the support member 23.

The reflector element 29 and the reflecting layer 32 of the board unit 14 of the first light emitting level 8 each consist of two parts, each part being associated with one of the two straight lines of light emitting diodes 21 on the board 26. These parts of the reflector element 29 and the reflecting layer 32 preferably have rectangular shape, with reflector cups 35 and apertures 36 being arranged on each part on a straight line corresponding to one of the straight lines on which the light emitting diodes are arranged on the board 26.

Figure 5:
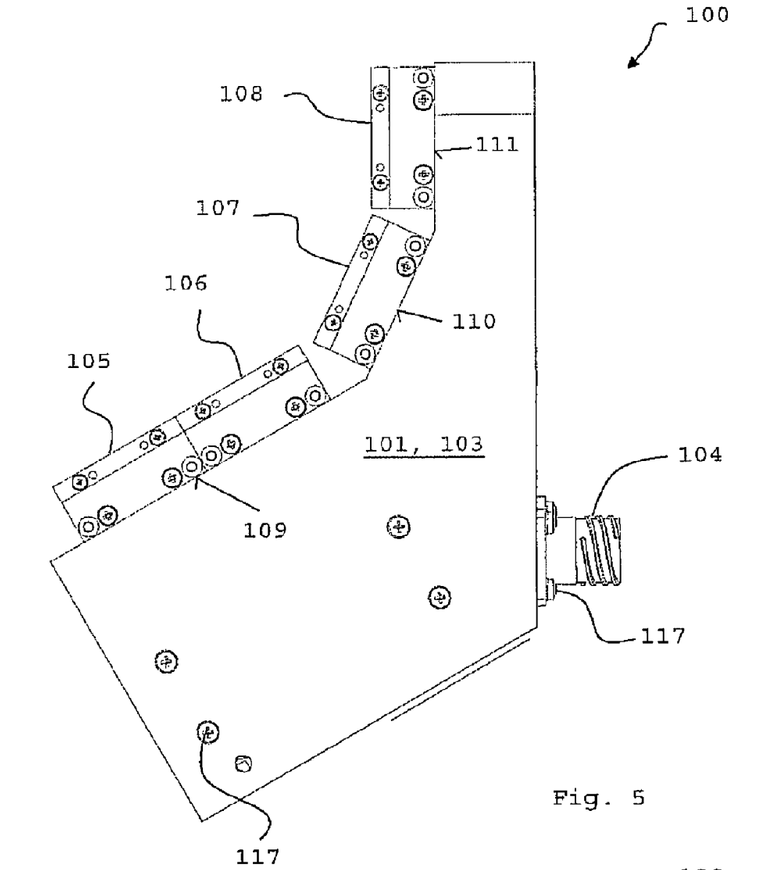
FIG. 5 shows a bottom view of a second embodiment of the anti-collision light.
Figure 6:
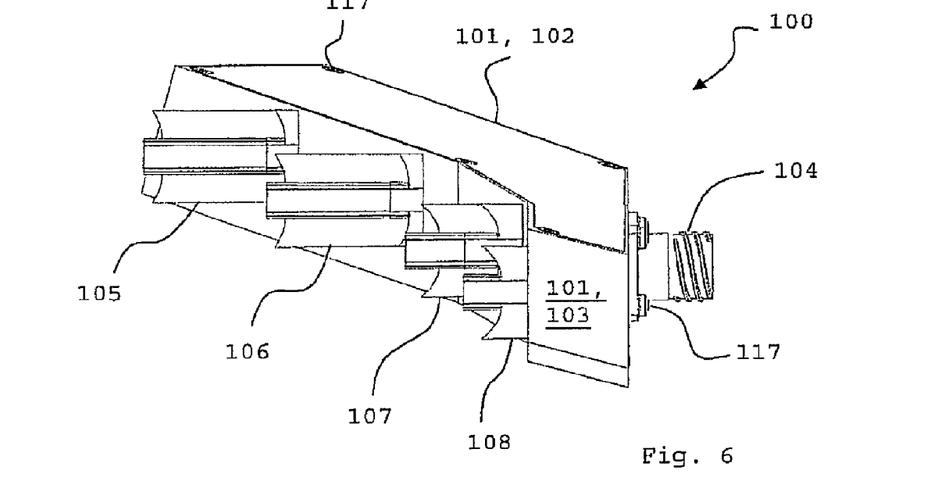
FIG. 6 shows a perspective view of the second embodiment of the anti-collision light.
Figure 7:
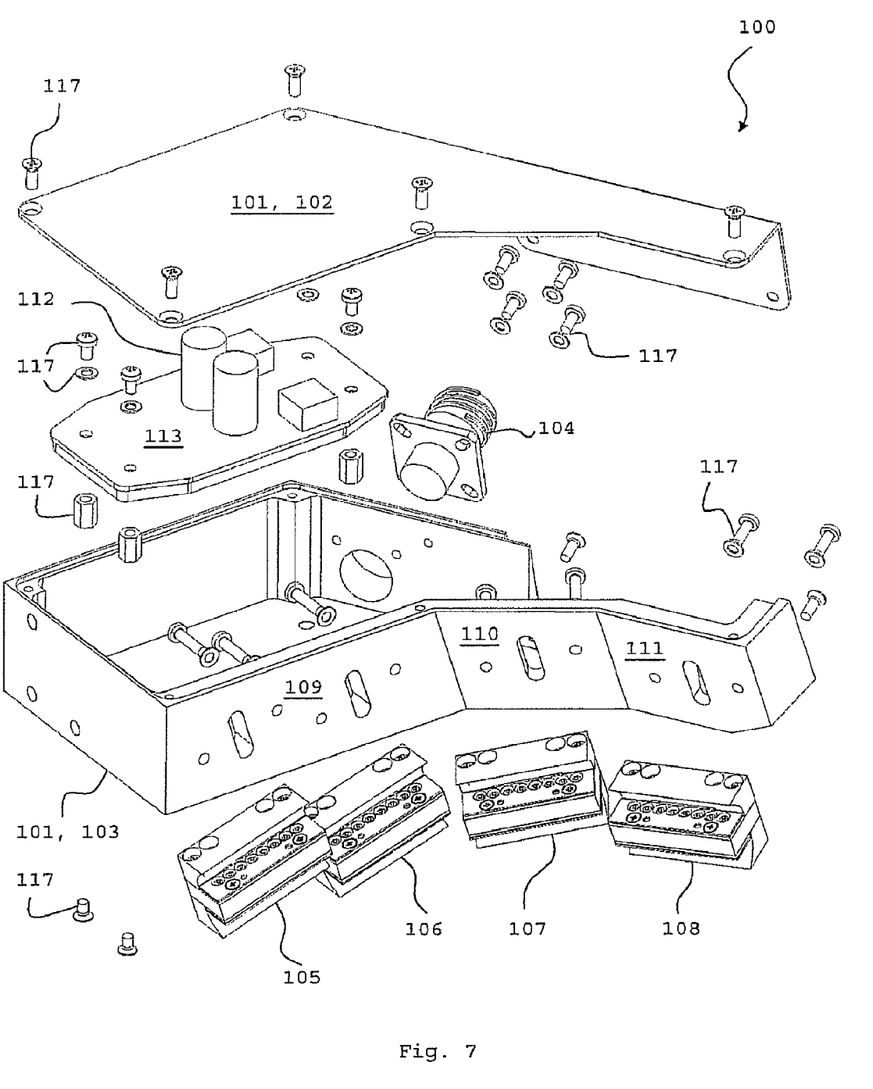
FIG. 7 shows an exploded view of the second embodiment of the anti-collision light.

A second embodiment 100 of an anti-collision light according to the invention is shown in FIG. 5 in bottom view, in FIG. 6 in side view and in FIG. 7 in exploded view. A housing 101 with a housing upper part 102 and a housing lower part 103 (confer FIGS. 6 and 7) is provided, the housing 101 being connected with a socket part 104 by which the anti-collision light 100 can be attached to an aircraft, preferably to one of its wings. The socket part 104 may have a screw thread for connecting the anti-collision light 100 to the aircraft.

The anti-collision light 100 comprises four modules 105, 106, 107, 108 which are attached to walls 109, 110, 111 of the housing lower part 103. Each module 105 to 108 has a first light emitting level and a second light emitting level, wherein the first light emitting level is arranged above the second light emitting level, the first light emitting level pointing into the opposite direction than the second light emitting level. The modules 105 to 108 and their first light emitting levels and second light emitting levels are described in detail below with reference to FIGS. 8 and 9.

Within the housing 101 there are provided electrical components 112, for example capacitors, which preferably are arranged on a components board 113, for supplying the modules 105 to 108 with electrical energy and/or for controlling the modules 105 to 108. The components board 113, the socket part 104, the housing upper part 102 and the modules 105 to 108 may be connected to the housing lower part 103 by appropriate connecting means 117, such as rivets, screws, washers, screw nuts or similar.

The modules 105 to 108 are arranged at the housing 101 next to each other, wherein each subsequent module 106 to 108 is arranged at a lower level than its preceding module 105 to 107. A subsequent module 106 to 108 is preferably arranged such that its first light emitting level is placed at a lower level than the second light emitting level of the preceding module 105 to 107.

The first module 105 and the second module 106 are preferentially arranged in a coplanar manner. This may be achieved by arranging the first module 105 and the second module 106 on the same wall 109 of the housing lower part 103 but at different levels. The third module 107 is preferably arranged in an obtuse angle with respect to the second module 106. This may be achieved by connecting the third module 107 to a wall 110 of the housing lower part 103 that is connected in an obtuse angle to the wall 109 on which the second module 106 is placed. Furthermore, the forth module 108 is preferably arranged at an obtuse angle with respect to the third module 107. This may correspondingly be achieved by connecting the forth module to a wall 111 of the housing lower part 103 that is connected at an obtuse angle with the wall 110 on which the third module 107 is arranged.

This arrangement of the four modules 105 to 108 has the advantage that the distribution of the light emitted by the four modules 105 to 108 of the anti-collision light 100 is optimized with respect to the shape of wing ends to which the anti-collision light 100 shall be connected.

Figure 8:
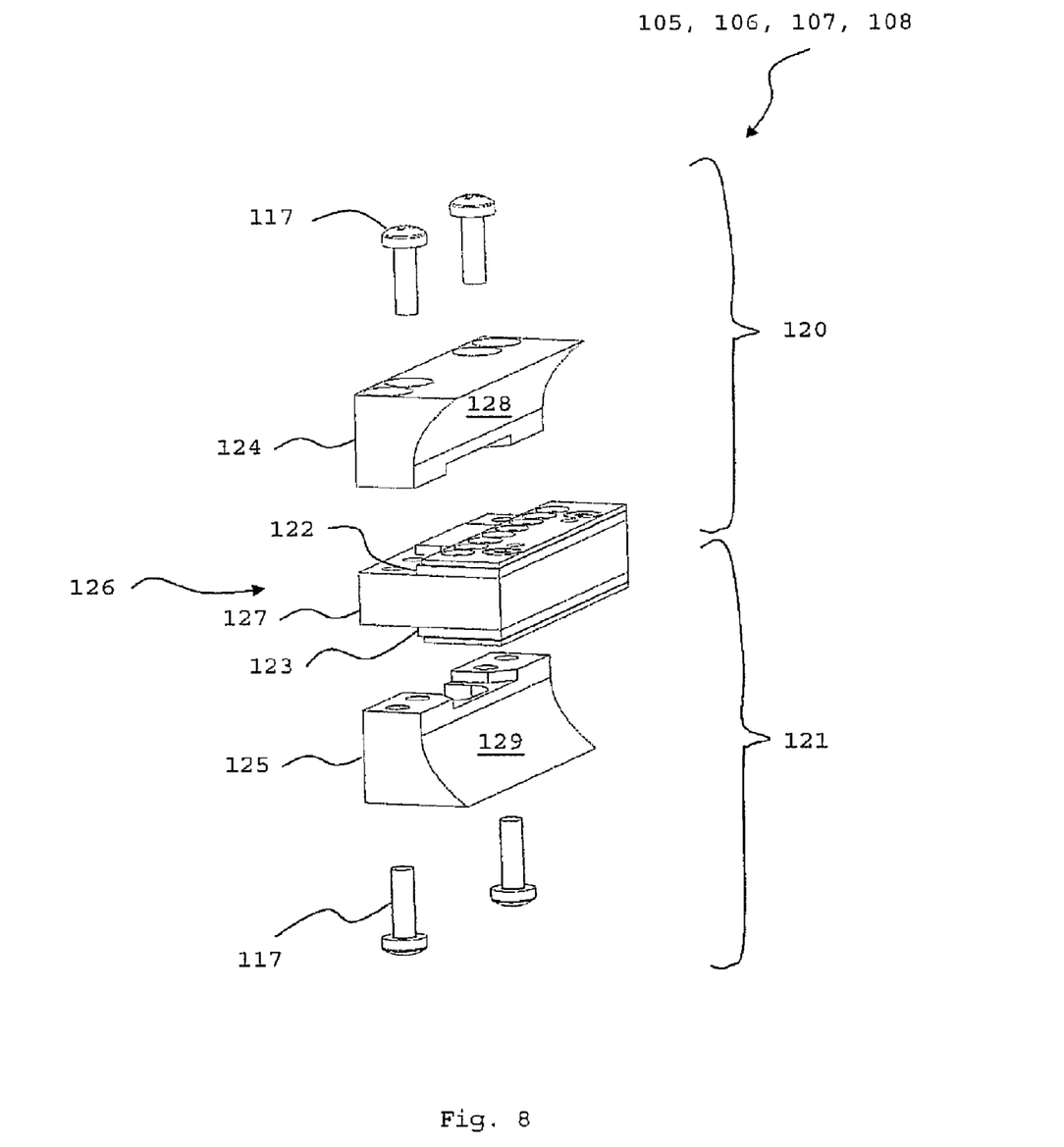
FIG. 8 shows an exploded view of a module of the second embodiment of the anti-collision light.

FIG. 8 shows an exploded view of one of the modules 105, 106, 107, 108 of the anti-collision light 100. Each module 105, 106, 107, 108 comprises a first light emitting level 120 and a second light emitting level 121, wherein the first light emitting level 120 is arranged above the second light emitting level 121 and the first light emitting level 120 points into the opposite direction than the second light emitting level 121. That is the first light emitting level 120 and the second light emitting level 121 are arranged in a back-to-back facing manner. Each light emitting level 120, 121 comprises a board 122, 123, in particular a circuit board, on which light emitting diodes 140 (confer FIG. 9) are arranged and a reflector 124, 125, with the board 122 and the reflector 124 of the first light emitting level 120 pointing into the opposite direction than the board 123 and the reflector 125 of the second light emitting level 121.

The boards 122 and 123 form part of a board unit 126, the board unit 126 comprising a support member 127. The boards 122, 123 are each arranged on one side of the support member 127, i.e. the board 122 of the first light emitting level 120 is arranged on the upper side of the support member 127 and the board 123 of the second light emitting level 121 is arranged on the lower side of the support member 127. The reflectors 124, 125 are accordingly each arranged on one side of the support member 127, wherein the reflector 124 is arranged on the same side of the support member 127 as the board 122 and the reflector 125 is arranged on the same side of the support member 127 as the board 123. Connecting means 117 such as screws or rivets can be used to connect the reflectors 124, 125 to the support member 127, the reflectors 124, 125 being preferably connected next to the corresponding boards 122, 123.

On each board 122, 123 the light emitting diodes 140 (confer FIG. 9) are preferably arranged on a straight line. The reflectors 124, 125 run in parallel to these straight lines and each have a reflecting surface 128, 129 which is parabolically shaped in such a way that light emitted by light emitting diodes essentially perpendicular to the boards 122, 123 is reflected in a lateral direction.

Figure 9:
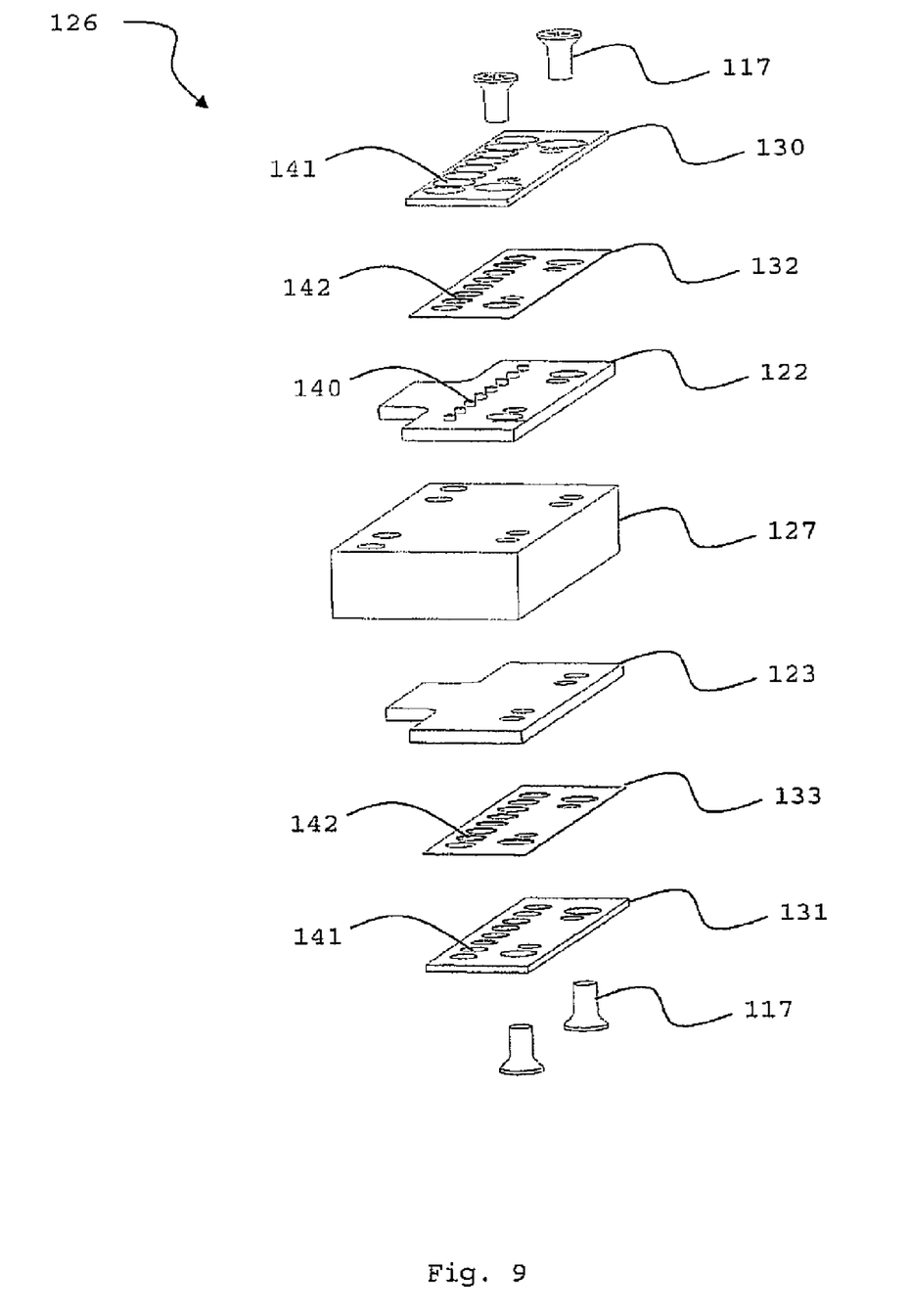
FIG. 9 shows an exploded view of a board unit of a module of the second embodiment of the anti-collision light and FIG. 10 shows a schematic representation of a light emitting diode mounted on a board.

FIG. 9 shows a board unit 126 of one of the modules 105, 106, 107, 108 in exploded view. As already mentioned with respect to FIG. 8 boards 122, 123, on each of which light emitting diodes 140 are arranged on a straight line, are connected to opposite sides of a support member 127. Hence, the light emitting diodes 140 of the boards 122, 123 face opposite directions.

For each light emitting level 120, 121 a reflector element 130, 131 is provided that is disposed over the light emitting diodes 140. The reflector elements 130, 131 each comprise reflector cups 141, the reflector cups 141 having apertures for receiving the light emitting diodes 140. Hence, the reflector cups 141 of the reflector elements 130, 131 are arranged on a straight line according to the light emitting diodes 140. The reflecting elements 130, 131 direct light emitted sidewardly by the light emitting diodes with the reflector cups 141 in a direction essentially perpendicular to the corresponding boards 122, 123.

Between the board 122, 123 and the reflector element 130, 131 of each light emitting level 120, 121 there is preferentially provided a reflecting layer 132, 133, each reflecting layer 132, 133 having apertures 142 for receiving the light emitting diodes 140. Hence, the apertures 142 of each reflecting layer 132, 133 are arranged on a straight line in accordance with the light emitting diodes 140 and the reflector cups 141. The reflecting layers 132, 133 have reflecting surfaces and can for example be thin gold layers. The areas on each board 122, 123 where bond wires (not shown) from the light emitting diodes 140 contact the board 122, 123 and printed connectors (not shown) lead from the bond wires to contact areas (not shown) of electric lines to the electronic components 112 shall not be covered by the reflecting layers 132, 133.

The reflecting layer 132 and the reflector element 130 of the first light emitting level 120 point into the opposite direction than the reflecting layer 133 and the reflector element 131 of the second light emitting level 121.

Connecting means 117, such as rivets and screws, can be used for connecting the reflector element 130, the reflecting layer 132 and the board 122 of the first light emitting level 120 to the upper side of the support member 127 and the reflector element 131, the reflecting layer 133 and the board 123 to the lower side of the support member 127.

Figure 10:
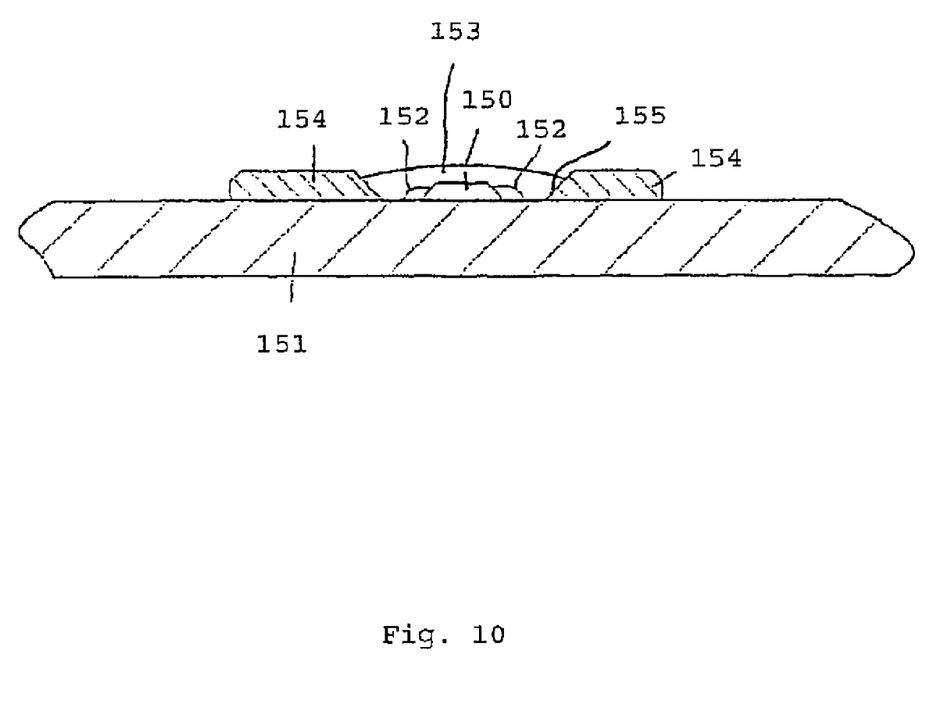

FIG. 10 shows a schematic representation of a light emitting diode 150, in particular in the form of a light emitting diode chip, which is mounted directly on a board 151. The light emitting diode 150 and the board 151 correspond to a light emitting diode 21, and a board 26, 27, 28 of a first embodiment 1 of an anti-collision light and to a light emitting diode 140 and a board 122, 123 of the second embodiment 100 of an anti-collision light according to the invention. Preferably, lensless light emitting diodes 150 are used. Bond wires 152 are used to connect the light emitting diode 150 directly to the board 151. Preferably, a transparent pourable plastic mass 153, for example a silicone mass, is used to protect the bond wires 152 and the light emitting diode 150. The transparent pourable silicon mass 153 forms a cover for the light emitting diode 150 and the bond wires 152.

A frame 154 for receiving the transparent mass 153 is used for forming a compartment around each light emitting diode 150. The frame 154 then contains the transparent mass 153. The frame 154 is preferably formed by one of the reflector elements 29, 30, 31 of the first embodiment 100 or by one of the reflector elements 130, 131 of the second embodiment 100 of the anti-collision light according to the invention. A reflector cup 155 then contains the transparent mass 153. The reflector cup 155 corresponds to a reflector cup 35 of the first embodiment 1 and to a reflector cup 141 of the second embodiment 100 of the anti-collision light according to the invention.

It is to be understood that while certain embodiments of the present invention have been illustrated and described herein, it is not to be limited to the specific embodiments described and shown.

The invention claimed is:

1. Anti-collision light for an aircraft comprising:
   a first light emitting level including a first board and a plurality of first light emitting diodes arranged on the first board in at least one straight line, the first light emitting level further including a first reflector configured to reflect light emitted by the first light emitting diodes in a first direction; and
   a second light emitting level positioned below the first light emitting level, the second light emitting level including a second board and a plurality of second light emitting diodes arranged on the second board in a closed line having a shape of one of an ellipse and a rounded rectangle, the second light emitting level further including a second reflector positioned between the first board with the first light emitting diodes and the second board with the second light emitting diodes, the second reflector being configured to reflect light emitted by the second light emitting diodes in the first direction which is substantially perpendicular to the first and the second board in a lateral direction.

2. Anti-collision light according to claim 1, wherein the at least one straight line in which the first light emitting diodes are arranged on the first board of the first light emitting level is substantially perpendicular to a major axis of the one of the ellipse and the rounded rectangle.

3. Anti-collision light according to claim 1, wherein the first light emitting diodes are arranged in at least two parallel straight lines on the first board.

4. Anti-collision light according to claim 1, further comprising a third light emitting level arranged below the second light emitting level and including a third board and a plurality of third light emitting diodes arranged on the third board in a second closed line having a shape of one of an ellipse and a rounded rectangle, the third light emitting level further including a reflector positioned between the second board with the second light emitting diodes and the third board with the third light emitting diodes, the third reflector being configured to reflect light emitted by the third light emitting diodes in the same first direction as the first and second reflectors, the first direction being substantially perpendicular to the third board in the lateral direction.

5. Anti-collision light according to claim 4, wherein at least one of the second board and the third board has a shape of an ellipse or a rounded rectangle.

6. Anti-collision light according to claim 4, wherein each board is arranged on a support member which has a shape of an ellipse or a rounded rectangle.

7. Anti-collision light according to claim 1, wherein each light emitting level further comprises a reflector element disposed over light emitting diodes of the each light emitting level, the reflector element comprising reflector cups, each reflector cup having an aperture for receiving a light emitting diode.

8. Anti-collision light according to claim 7, wherein each light emitting level further comprises a reflecting layer positioned between a board and the reflector element of the each light emitting level, the reflecting layer having apertures for the light emitting diodes.

9. Anti-collision light according to claim 1, wherein the light emitting diodes are lensless.

10. Anti-collision light according to claim 7, wherein the light emitting diodes of each light emitting level are covered by a transparent mass.

11. Anti-collision light according to claim 10, wherein each reflector element forms a frame for receiving the transparent mass.

12. Anti-collision light according to claim 10, wherein the transparent mass is a pourable silicone mass.

13. Anti-collision light for an aircraft comprising:
   a first module having
   a support member including a first side and a second side located opposite to the first side,
   a first light emitting level arranged on the first side of the support member, the first light emitting level including a first board and a plurality of first light emitting diodes arranged on the first board in a first straight line, the first light emitting level further including a first reflector positioned in contact with the first side of the support member and configured to reflect light emitted by the first light emitting diodes; and
   a second light emitting level arranged on the second side of the support member such that the first light emitting level is positioned opposite and above the second light emitting level, the first light emitting level pointing in an opposite direction from the second light emitting level, the second light emitting level including a second board and a plurality of second light emitting diodes arranged on the second board in a second straight line, the second light emitting level further including a second reflector positioned in contact with the second side of the support member and configured to reflect light emitted by the second light emitting diodes;
   further comprising at least one second module having
   a second support member including a first side and a second side, the second side of the second support member located opposite to the first side of the second support member,
   a third light emitting level arranged on the first side of the second support member, the third light emitting level including a third board and a plurality of third light emitting diodes arranged on the third board in a third straight line, the third light emitting level further including a third reflector positioned in contact with the first side of the second support member and configured to reflect light emitted by the third light emitting diodes; and a fourth light emitting level arranged on the second side of the second support member such that the third light emitting level is positioned opposite and above the fourth light emitting level, the third light emitting level pointing in an opposite direction from the fourth light emitting level, the fourth light emitting level including a fourth board and a plurality of fourth light emitting diodes arranged on the fourth board in a fourth straight line, the fourth light emitting level further including a fourth reflector positioned in contact with the second side of the second support member and configured to reflect light emitted by the fourth light emitting diodes;

wherein the at least one second module is arranged on a lower level than the at least one first module.

14. Anti-collision light according to claim 13, further comprising at least one third module, that is arranged next to the at least one second module and on a lower level than the at least one second module, the at least one third module including a third support member including a first side and a second side, the second side of the third support member located opposite to the first side of the third support member, a fifth light emitting level arranged on the first side of the third support member, the fifth light emitting level including a fifth board and a plurality of fifth light emitting diodes arranged on the fifth board in a fifth straight line, the fifth light emitting level further including a fifth reflector positioned in contact with the first side of the third support member and configured to reflect light emitted by the fifth light emitting diodes; and a sixth light emitting level arranged on the second side of the third support member such that the fifth light emitting level is positioned opposite and above the sixth light emitting level, the fifth light emitting level pointing in an opposite direction from the sixth light emitting level, the sixth light emitting level including a sixth board and a plurality of sixth light emitting diodes arranged on the sixth board in a sixth straight line, the sixth light emitting level further including a sixth reflector positioned in contact with the second side of the third support member and configured to reflect light emitted by the sixth light emitting diodes.

15. Anti-collision light according to claim 14, wherein the at least one third module is arranged at an angle with respect to the at least one second module.

16. Anti-collision light according to claim 15, further comprising at least one fourth module, that is arranged next to the at least one third module and on a lower level than the at least one third module, the at least one fourth module including a fourth support member including a first side and a second side, the second side of the fourth support member located opposite to the first side of the fourth support member, a seventh light emitting level arranged on the first side of the fourth support member, the seventh light emitting level including a seventh board and a plurality of seventh light emitting diodes arranged on the seventh board in a seventh straight line, the seventh light emitting level further including a seventh reflector positioned in contact with the first side of the fourth support member and configured to reflect light emitted by the seventh light emitting diodes; and an eighth light emitting level arranged on the second side of the fourth support member such that the seventh light emitting level is positioned opposite and above the eighth light emitting level, the seventh light emitting level pointing in an opposite direction from the eighth light emitting level, the eighth light emitting level including an eighth board and a plurality of eighth light emitting diodes arranged on the eighth board in an eighth straight line, the eighth light emitting level further including an eighth reflector positioned in contact with the second side of the fourth support member and configured to reflect light emitted by the eighth light emitting diodes.

17. Anti-collision light according to claim 16, wherein the at least one fourth module is arranged at an angle with respect to the at least one third module.

18. Anti-collision light according to claim 13, wherein the reflectors are parabolically shaped.

* * * * *